US012736918B2

(12) United States Patent
Sawai et al.

(10) Patent No.: US 12,736,918 B2
(45) Date of Patent: Sep. 15, 2026

(54) WATCH COMPONENT, WATCH, AND METHOD FOR MANUFACTURING WATCH COMPONENT

(71) Applicant: SEIKO EPSON CORPORATION, Tokyo (JP)

(72) Inventors: Takenori Sawai, Shiojiri (JP); Katsunori Kume, Shiojiri (JP); Takuya Miyakawa, Matsumoto (JP)

(73) Assignee: SEIKO EPSON CORPORATION (JP)

(*) Notice: Subject to any disclaimer, the term of this patent is extended or adjusted under 35 U.S.C. 154(b) by 390 days.

(21) Appl. No.: 18/333,745

(22) Filed: Jun. 13, 2023

(65) Prior Publication Data

US 2023/0400813 A1 Dec. 14, 2023

(30) Foreign Application Priority Data

Jun. 14, 2022 (JP) ................................ 2022-095532

(51) Int. Cl.

*G04B 19/12* (2006.01)
*G04B 19/04* (2006.01)
*G04D 3/00* (2006.01)

(52) U.S. Cl.

CPC ........... *G04B 19/12* (2013.01); *G04B 19/042* (2013.01); *G04D 3/0092* (2013.01)

(58) Field of Classification Search

CPC ........ G04B 19/12; G04B 19/06; G04B 19/00; G04B 19/042; G04B 19/04; G04B 5/165; G04B 5/16; G04B 5/02; G04B 5/00; G04B 37/223; G04B 37/22; G04B 37/00; G04B 45/0007; G04B 45/00; G04B 45/0015; G04D 3/0092; G04D 3/0074; G04D 3/00; C23C 14/0015; C23C 14/00;

(Continued)

(56) References Cited

U.S. PATENT DOCUMENTS 3,633,355 A * 1/1972 Sakata .................. G04B 19/18 968/156
5,972,233 A * 10/1999 Becker ...................... B44F 1/04 430/13

(Continued)

FOREIGN PATENT DOCUMENTS

EP 1544690 A1 6/2005
EP 3991906 A1 5/2022

(Continued)

OTHER PUBLICATIONS

Musha, Internet <URL: https://web.archive.org/web/20191117093356/https://musha.shop/>, [Retrieved Apr. 10, 2026], Nov. 17, 2019, https://musha.shop/(Wayback Machine), [online] (9 Pages).

*Primary Examiner* — Lawrence Averick
(74) *Attorney, Agent, or Firm* — Harness, Dickey & Pierce, P.L.C.

(57) ABSTRACT

A watch component is formed of a metal member formed into a component shape. A surface of the metal member includes a coated region being coated with a coating material having a color different from a material color of the metal member and an exposed region from which the material color of the metal member is exposed. A boundary part between the coated region and the exposed region forms a blade-pattern-like design.

5 Claims, 16 Drawing Sheets

(58) Field of Classification Search
CPC ....... C23C 16/006; C23C 16/04; C23C 16/00; A44C 27/007; A44C 27/005; A44C 27/001; A44C 27/00; A44B 45/00
USPC .................................................. 29/896.3, 592
See application file for complete search history.

(56) References Cited

U.S. PATENT DOCUMENTS

| | | | | |
|---|---|---|---|---|
| 6,501,014 | B1* | 12/2002 | Kubota | H10F 19/35 257/434 |
| 11,745,536 | B2* | 9/2023 | Bienvenu | G04B 19/103 29/896.3 |
| 2004/0233795 | A1* | 11/2004 | Fujii | G04B 37/22 368/285 |
| 2004/0247904 | A1* | 12/2004 | Chan | C23C 14/5853 428/448 |
| 2005/0126917 | A1* | 6/2005 | Morimoto | G04B 19/12 368/283 |
| 2005/0136284 | A1* | 6/2005 | Grippo | G04B 45/0076 428/688 |
| 2007/0026205 | A1* | 2/2007 | Anton | C23C 14/0015 428/195.1 |
| 2012/0147353 | A1* | 6/2012 | Lafarre | H01L 21/6875 355/72 |
| 2014/0308513 | A1 | 10/2014 | Miura | |
| 2015/0079760 | A1* | 3/2015 | Lei | H10D 84/01 438/462 |
| 2016/0053412 | A1* | 2/2016 | Bender | D02H 5/00 28/200 |
| 2018/0087169 | A1* | 3/2018 | Miyakawa | C25D 7/005 |
| 2019/0171164 | A1* | 6/2019 | Bossart | G04B 19/042 |
| 2019/0302697 | A1* | 10/2019 | Larriere | C23C 14/14 |
| 2020/0292996 | A1* | 9/2020 | Jeanrenaud | B44C 1/227 |
| 2021/0177111 | A1* | 6/2021 | Jeanrenaud | C23C 14/5873 |
| 2021/0181693 | A1* | 6/2021 | Takasawa | G04G 17/08 |
| 2022/0137564 | A1 | 5/2022 | Uehara et al. | |

FOREIGN PATENT DOCUMENTS

| | | | |
|---|---|---|---|
| JP | H01-232283 | A | 9/1989 |
| JP | H03-226591 | A | 10/1991 |
| JP | H04-187757 | A | 7/1992 |
| JP | H05-040182 | A | 2/1993 |
| JP | 2007-278737 | A | 10/2007 |
| JP | 2013-151137 | A | 8/2013 |
| JP | 3219219 | U | 12/2018 |

* cited by examiner

WATCH COMPONENT, WATCH, AND METHOD FOR MANUFACTURING WATCH COMPONENT

The present application is based on, and claims priority from JP Application Serial Number 2022-095532, filed Jun. 14, 2022, the disclosure of which is hereby incorporated by reference herein in its entirety.

BACKGROUND

1. Technical Field

The present disclosure relates to a watch component, a watch, and a method for manufacturing a watch component.

2. Related Art

In addition to practicality for checking the time, a watch also has an aspect as a luxury item that a user favors. For example, Japanese Utility Model Registration No. 3219219 discloses a table clock that uses a hand guard of a Japanese sword as a dial. With this, the table clock enables appreciation of the hand guard and time display at the same time.

However, Japanese Utility Model Registration No. 3219219 uses an actual hand guard of a Japanese sword, and hence is not applicable to a wrist watch, a pocket watch, or the like. Therefore, a watch component that has a blade-pattern design symbolizing a Japanese sword and can be mass-produced has been desired as a watch component applicable to a wrist watch.

SUMMARY

A watch component according to the present disclosure is formed of a metal member formed into a component shape, wherein a surface of the metal member includes a coated region being coated with a coating material having a color different from a material color of the metal member and an exposed region from which the material color of the metal member is exposed, and a boundary part between the coated region and the exposed region forms a blade-pattern-like design.

A watch component according to the present disclosure is formed of Tamahagane steel formed into a component shape, wherein the Tamahagane steel has a surface having a coated region being coated with an oxide film and an exposed region from which a material color of the Tamahagane steel is exposed, and a boundary part between the coated region and the exposed region forms a blade-pattern-like design.

A watch according to the present disclosure includes the above-described watch component.

A method for manufacturing a watch component according to the present disclosure includes a shaping step for shaping a metal member by shaping a metal material into a watch component shape, a coating step for coating a surface of the metal member with a coating material having a color different from a material color of the metal member, and a design forming step for forming, by peeling a part of the coating material, an exposed region from which the material color of the metal member is exposed, and forming, with a coated region being coated with the coating material, a blade-pattern-like design at a boundary part therebetween.

A method for manufacturing a watch component according to the present disclosure includes a shaping step for shaping a metal member by shaping a metal material into a watch component shape, a masking step for masking, with a masking material, an exposed region from which a material color of the metal member is exposed, a design forming step for forming a coated region by coating a surface of the metal member with a coating material having a color different from a material color of the metal member, and forming, with the exposed region, a blade-pattern-like design at a boundary part therebetween, and a mask removing step for removing the masking material.

A method for manufacturing a watch component according to the present disclosure includes a shaping step for shaping Tamahagane steel into a watch component shape, and a design forming step for forming, by pealing a part of an oxide film coating a surface of the Tamahagane steel, an exposed region from which a material color of the Tamahagane steel is exposed, and forming, with a coted region being coated with the oxide film, a blade-pattern-like design at a boundary part therebetween.

DESCRIPTION OF EXEMPLARY EMBODIMENTS

First Exemplary Embodiment

A watch 1 according to a first exemplary embodiment is described below with reference to the drawings.

Figure 1:
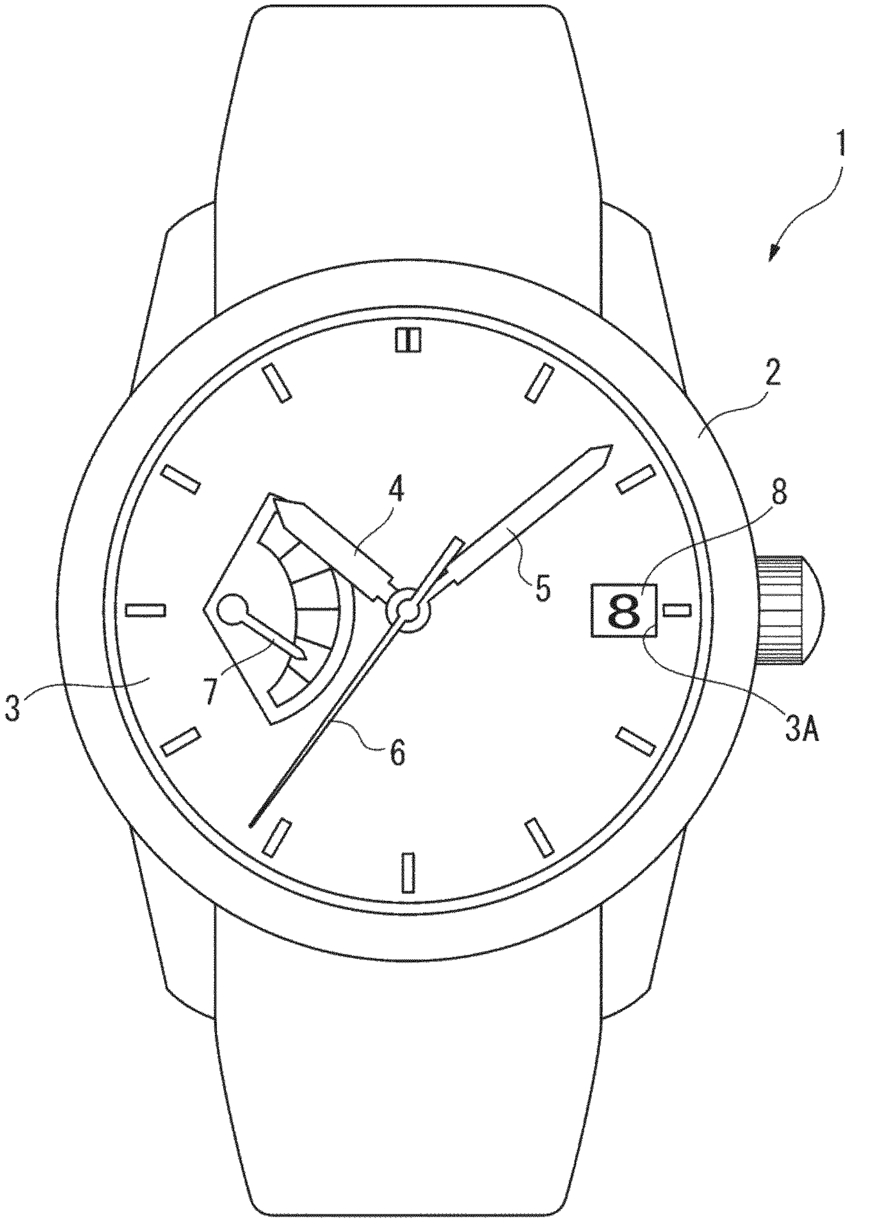
FIG. 1 is a front view illustrating a watch that uses a heavy weight of an oscillating weight being a watch component of a first exemplary embodiment.
Figure 2:
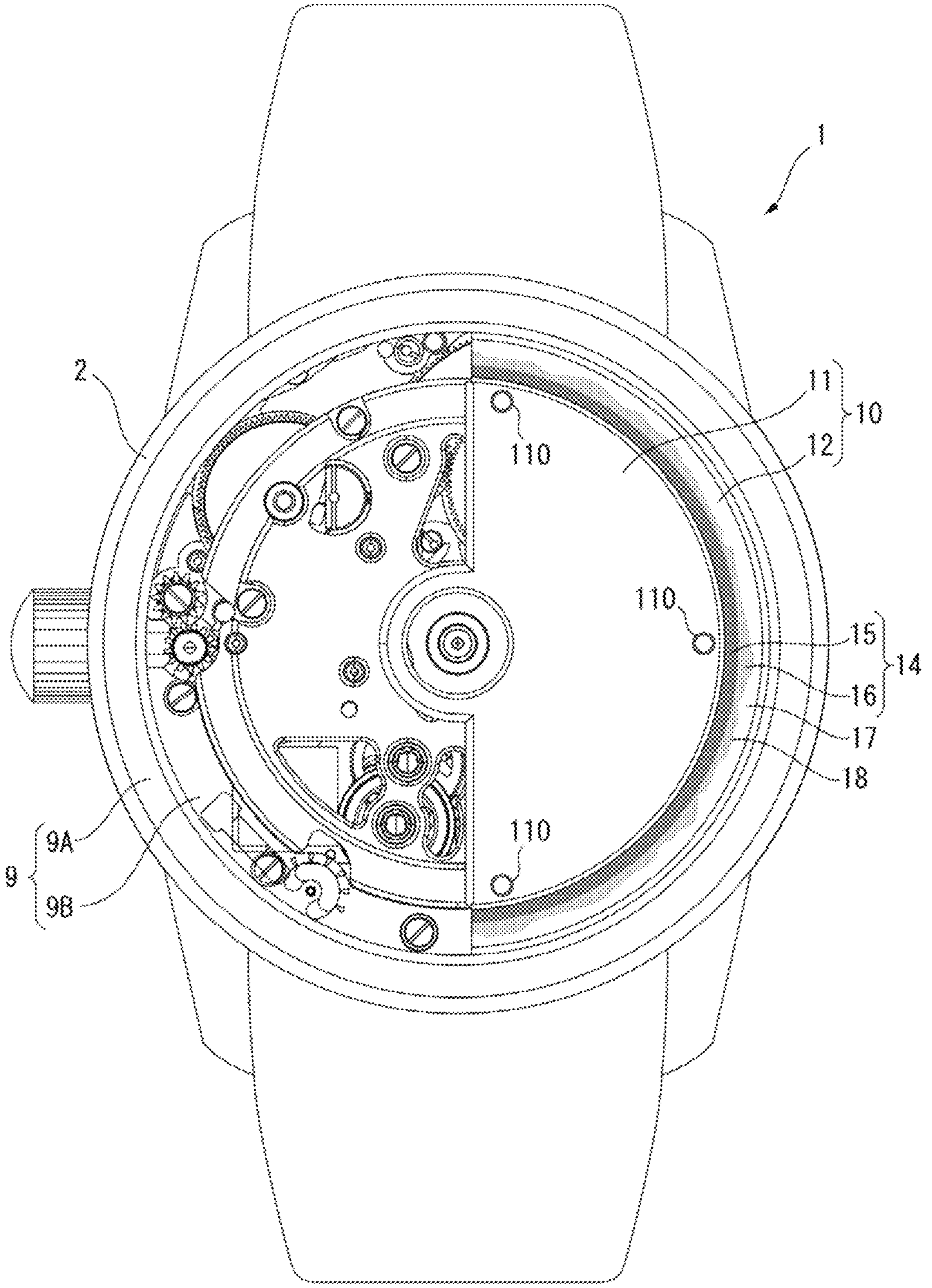
FIG. 2 is a back view illustrating the watch that uses the heavy weight of the first exemplary embodiment.

FIG. 1 is a front view illustrating the watch 1, and FIG. 2 is a back view illustrating the watch 1. The watch 1 of the present exemplary embodiment is a wrist watch that a user wears on a wrist, and includes a cylindrical outer case 2 and a dial 3 arranged on an inner circumference side of the outer case 2. Of two openings of the outer case 2, one opening on the front surface side is closed by a cover glass, and the other opening on the back surface side is closed by a case back 9. The case back 9 includes a ring-like frame 9A and a case back glass 9B attached to the frame 9A. In the outer case 2, a movement using a mainspring, which is omitted in illustration, as a driving source is accommodated, and an oscillating weight 10 forming an automatic winding-up mechanism for winding up the mainspring is also provided.

The watch movement including the mainspring and the oscillating weight 10 is publicly known, and hence description therefor is omitted. Further, the outer case 2, the cover glass, and the case back 9 form an outer member of the watch 1 that seals an inner space for accommodating the movement.

As illustrated in FIG. 1, the watch 1 includes an hour hand 4, a minute hand 5, and a seconds hand 6 that indicate time information and a power reserve hand 7 that indicates a winding-up residual amount of the mainspring. The dial 3 is provided with a calendar small window 3A, and a date indicator 8 is visually recognizable through the calendar small window 3A.

As illustrated in FIG. 2, the oscillating weight 10 includes a weight body 11 that is axially supported by a train wheel bridge of the movement in a freely rotatable manner and a heavy weight 12 that is fixed to an outer circumference of the weight body 11 with a fastening member 110 such as a pin and a rivet. Note that the weight body 11 and the heavy weight 12 may be firmly fixed to each other by an adhesive, welding, or the like. Alternatively, the weight body 11 and the heavy weight 12 may be shaped in an integrated manner.

Figure 3:
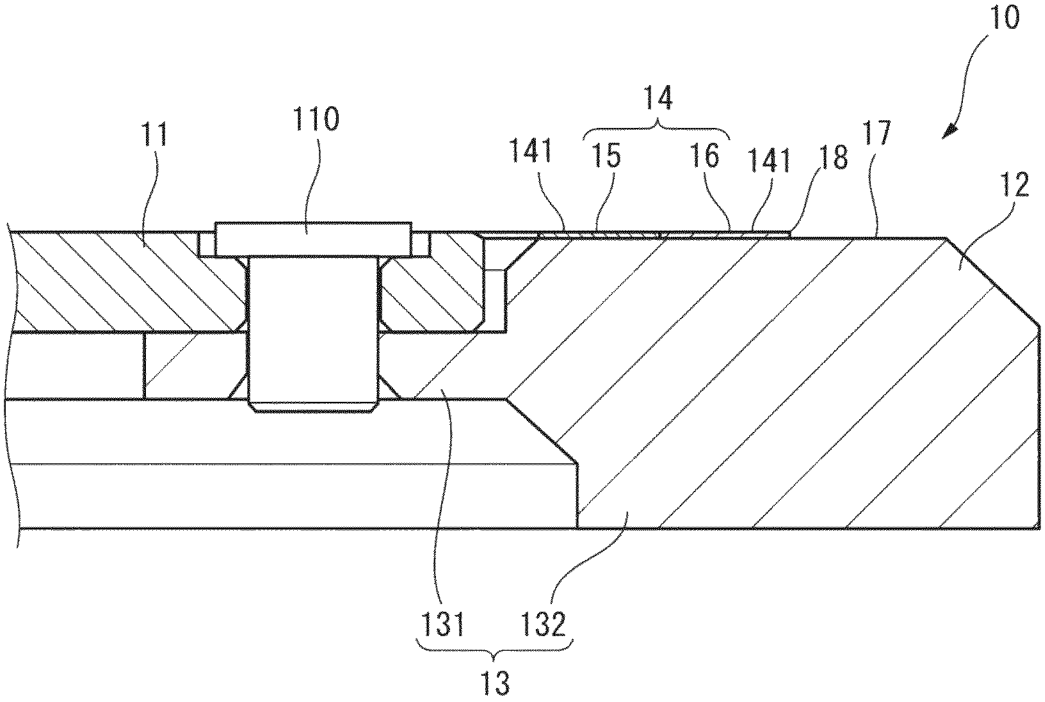
FIG. 3 is a cross-sectional view illustrating the heavy weight of the first exemplary embodiment.

The heavy weight 12 is a watch component on which a blade-pattern-like design is formed, and is formed of, as illustrated in FIG. 3, a metal member 13 and a coating material 141. The metal member 13 is obtained by shaping a metal material being any one of stainless steel, titanium, and silver into a component shape of the heavy weight 12. A coating material 141 is laminated on a surface of the metal member 13. The metal member 13 includes an attachment piece 131 attached to the weight body 11 with the fastening member 110 and a heavy weight main body 132 thicker than the attachment piece 131.

On a surface of the heavy weight main body 132, that is, a surface that is visually recognizable through the case back glass 9B, a coated region 14 that is formed by laminating the coating material 141 and an exposed region 17 from which the metal member 13 is exposed are provided.

As illustrated in FIG. 2, the coated region 14 includes a first coated region 15 provided on the weight body 11 side, that is, an inner circumferential side, and a second coated region 16 provided on an outer circumferential side of the first coated region 15.

The first coated region 15 is a region modeled after a ridge ling of a Japanese sword, and is assumed to have a color darker than the second coated region 16 and the exposed region 17. Specifically, the first coated region 15 is a region coated with the coating material 141 having a color different from a material color of the metal member 13. Here, the material color of the metal member 13 is a silver color or the like, and hence a color of the coating material 141 may be a black color or a dark color close to black, such as black, gray, and navy blue. Note that the coating material 141 is formed of a paint with which the surface of the metal member 13 can be coated.

The second coated region 16 is a region modeled after a blade of a Japanese sword, and is assumed to have a color that is lighter than the first coated region 15 and darker than the exposed region 17. Specifically, the second coated region 16 is a region having a color lighter than the first coated region 15 by performing coating with the coating material 141 and then controlling a peeling amount of the coating material 141 with laser treatment. The exposed region 17 is a region modeled after a cutting edge of a Japanese sword, and is a region from which the metal member 13 is exposed. Thus, the exposed region 17 is assumed to be a region from which the material color of the metal member 13, for example, a silver color is exposed.

Further, a boundary line between the second coated region 16 and the exposed region 17 forms a blade-pattern-like design 18. The blade-pattern-like design 18 is a design formed by a difference of the colors of the coated region 14 coated with the coating material 141 and the exposed region 17 from which the material color of the metal member 13 is exposed. The blade pattern is not formed by changing components of the metal member 13, and hence is defined as the blade-pattern-like design 18.

Figure 4:
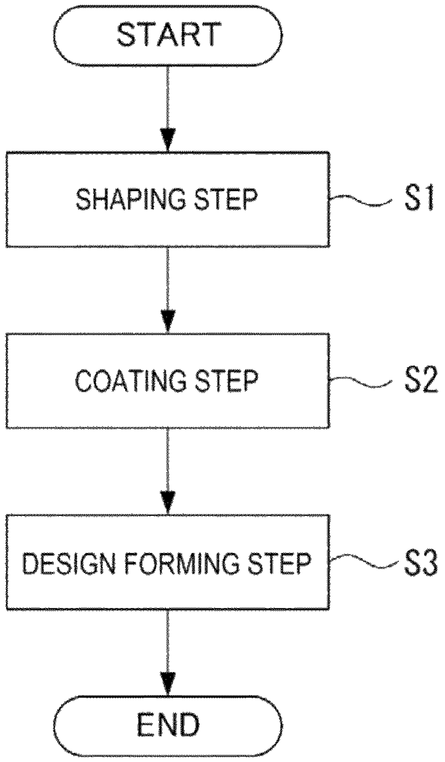
FIG. 4 is a flowchart illustrating manufacturing steps of the heavy weight of the first exemplary embodiment.

Next, a method for manufacturing the heavy weight 12 being a watch component is described with reference to the flowchart of FIG. 4.

First, a shaping step S1 for shaping the metal member 13 by shaping a metal material such as stainless steel, titanium, and silver into a watch component shape is executed. In the present exemplary embodiment, the watch component is the heavy weight 12. Thus, in the shaping step S1, the metal material such as stainless steel melted, and is poured into a mold for a heavy weight. With this, the metal member 13 is shaped.

Subsequently, a coating step S2 for coating the surface of the metal member 13 with the coating material 141 is executed. As a method for coating the coating material 141, for example, various film forming methods such as vapor deposition, sputtering, and CVD may be used in accordance with types of the coating material 141 and the metal member 13. CVD is an abbreviation for chemical vapor deposition, and is referred to as kagaku-kisou-seichou in Japanese.

Subsequently, a design forming step S3 for forming the blade-pattern-like design 18 is executed. In the design forming step S3 of the present exemplary embodiment, the design 18 is formed by scratching and peeling the coating material 141 with which the second coated region 16 and the exposed region 17 are coated.

Here, as described below, a plurality of treatment methods are conceived as a treatment method for peeling the coating material 141 and forming the design 18. Thus, an appropriate treatment method may be adopted in accordance with types of the metal member 13 and the coating material 141, a shape and a size of the metal member 13, or the like.

A first treatment method is laser treatment. Laser treatment is a treatment method for collecting light energy with a lens and melting the coating material 141 or metal for removal. Further, a removal amount of the coating material 141 can also be adjusted by adjusting laser intensity.

Therefore, the second coated region 16 can be formed to have a color lighter than the first coated region 15 by performing irradiation with laser light beam with reduced intensity and removing the coating material 141 at a predetermined rate. For example, when the coating material 141 is a black color, the first coated region 15 is a region having a black color, and the second coated region 16 is a region having a color lighter than the black color, that is, a gray color.

Further, the exposed region 17 from which the material color of the metal member 13 is exposed can be formed by performing irradiation with a laser light beam with increased intensity and removing the coating material 141.

The second coated region 16 and the exposed region 17 are formed by using a laser light beam as described above. With this, the blade-pattern-like design 18 being the boundary line between the respective regions 16 and 17 can also be formed at high accuracy.

Note that intensity of the laser light beam may be set in advance for each of the regions 16 and 17. Further, when a color of a blade pattern of an existing Japanese sword is reproduced, the color of the blade pattern of the Japanese sword is measured with a color measurement device, and intensity of the laser light beam is set in accordance with the color. With this. The color of the blade pattern may be reproduced.

When the second coated region 16 is formed with the laser light beam, intensity of the laser light beam is reduced in a region of the second coated region 16 on the first coated region 15 side, and intensity of the laser light beam is increased in a region thereof on the exposed region 17 side. With this, the second coated region 16 may have gradation from the dark part to the light part as approaching the exposed region 17 side from the first coated region 15 side.

Similarly, when the exposed region 17 is formed with the laser light beam, control is performed so that the coating material 141 is sparsely left on a part of the exposed region 17 on the second coated region 16 side. With this, the blade-pattern-like design 18 may be formed into a band-like shape instead of a line. In other words, the exposed region 17 from which the material color of the metal member 13 is exposed is not limited to a region from which the coating material 141 is completely removed, and is only required to be a region where the material color of the metal member 13 is visually recognized mainly. Thus, the coating material 141 may sparsely be left.

Moreover, when the exposed region 17 is formed with the laser light beam, fine irregularities may be formed on a surface part of the exposed region 17 on the second coated region 16 side, and thus a part that appears to be white due to irregular reflection of light is formed. With this, the blade-pattern-like design 18 may be formed. In other words, a blade pattern of a Japanese sword has a part that appears to be a white particle-like pattern called Nie or a fog-like pattern called Nioi. The design 18 modeled after such a blade pattern may be formed.

In other words, the blade-pattern-like design 18 is not limited to a linear design formed with the boundary part between the second coated region 16 being the coated region 14 and the exposed region 17, and may be a design formed into a band-like shape or the like.

A second treatment method is blasting. Blasting is a surface treatment processing method for performing roughening, grinding, grinding/cleaning, or the like of a surface by jetting and an polishing agent having innumerable particles and causing the polishing agent to collide against a workpiece. Further, a removal amount of the coating material 141 can also be adjusted by adjusting blasting setting conditions such as a type, a jetting amount, a jetting speed of the polishing agent as appropriate.

Therefore, both the regions being the first coated region 15 and the exposed region 17 are covered with a masking material, and the second coated region 16 being exposed is subjected to blasting. In this state, the blasting setting conditions are adjusted, and the coating material 141 is removed at a predetermined rate. With this, the second coated region 16 having a color lighter than the first coated region 15 can be formed.

Further, both the regions being the first coated region 15 and the second coated region 16 are coated with the masking material, and the exposed region 17 being exposed is subjected to blasting. In this state, the blasting setting conditions are adjusted, and the coating material 141 is removed. With this, the exposed region 17 from which the material color of the metal member 13 is exposed can be formed.

Note that, when the second coated region 16 is subjected to blasting, the masking material covering the first coated region 15 and the exposed region 17 is brought into close contact with the metal member 13, and the masking material for controlling a peeling amount of the coating material 141 of the second coated region 16 is arranged at an interval with the metal member 13. With this, the second coated region 16 may have a gradation color. In other words, the polishing agent is jetted onto the metal member 13 that corresponds to an interval between the second coated region 16 and the masking material, a jetting force is reduced in a region of the second coated region 16 on the first coated region 15 side, and a jetting force is increased in a region thereof on the exposed region 17 side. With this, the second coated region 16 may have gradation from the dark part to the light part as approaching the exposed region 17 side from the first coated region 15 side.

Note that the interval between the masking material for controlling a peeling amount and the metal member 13 may be approximately from 1 mm to 5 mm, for example. When the interval is narrow, for example, smaller than 1 mm, the particles of the polishing agent may not enter the interval, and thus the coating material 141 may not be polished. Meanwhile, when the interval is wide, for example, larger than 5 mm, the masking material cannot exert a masking effect, and there may be a difficulty in obtaining a gradation effect.

Moreover, the blasting conditions for the exposed region 17 on the second coated region 16 side are set. With this, similarly to laser treatment, the coating material 141 may sparsely be left, or the design 18 may be obtained by forming fine irregularities on the surface part.

A third treatment method is polishing treatment with a polishing treatment device. Polishing treatment is a treatment technique for obtaining a smooth condition by filing a surface of a material by a small amount with fine and hard particles called abrasive grains. Further, a removal amount of the coating material 141 can also be adjusted by adjusting polishing treatment conditions such as a type and a size of the abrasive grains, and a polishing time period.

Therefore, the polishing treatment conditions for the second coated region 16 are adjusted, and the coating material 141 is removed at a predetermined rate. With this, the second coated region 16 having a color lighter than the first coated region 15 can be formed.

Further, the exposed region 17 from which the material color of the metal member 13 is exposed can be formed by adjusting the polishing treatment conditions for the exposed region 17 and removing the coating material 141.

Moreover, the polishing treatment conditions for a region of the second coated region 16 on the first coated region 15 side and the polishing treatment conditions for a region thereof on the exposed region 17 side are changed. With this, the second coated region 16 may have gradation from the dark part to the light part as approaching the exposed region 17 side from the first coated region 15 side. Further, the polishing treatment conditions for the exposed region 17 on the second coated region 16 side are set. With this, similarly to laser treatment, the coating material 141 may sparsely be left, or the design 18 may be obtained by forming fine irregularities on the surface part.

A fourth treatment method is a method for removing the coating material 141 through use of a grindstone or the like by an operator being a professional grinder. A removal state of the coating material 141 can be adjusted by the way the operator performs grinding, and each of the second coated region 16 and the exposed region 17 can be formed.

A fifth treatment method is immersion processing for removing the coating material 141 through use of a chemical liquid. Specifically, a part of the metal member 13 to which the coating material 141 is applied is immersed in a chemical liquid formed of an acid or alkali aqueous solution that dissolves the metal member 13 and the coating material 141, and thus the coating material 141 is removed. Further, a removal amount of the coating material 141 can also be adjusted by adjusting immersion processing conditions such as a type and a concentration of the chemical liquid, and an immersion time period.

Therefore, the second coated region 16 and the exposed region 17 are immersed in the chemical liquid, and a time period during which the exposed region 17 is immersed in the chemical liquid is set shorter than a time period during which the second coated region 16 is immersed in the chemical liquid. With this, the second coated region 16 having a color lighter than the first coated region 15 and the exposed region 17 from which the material color of the metal member 13 is exposed can be formed.

In this state, a liquid surface of the chemical liquid is caused to undulate, and thus the design 18 having a wave-like shape can be formed. Thus, an ultrasonic vibration device or the like may be used to actively cause the liquid surface of the chemical liquid to undulate.

A sixth treatment method is a method for applying a chemical liquid onto a region from which the coating material 141 is removed. In this case, a removal amount of the coating material 141 can also be adjusted by adjusting application conditions such as a type and a concentration of the chemical liquid to be applied, and an application time period.

Therefore, the chemical liquid is applied to each of the second coated region 16 and the exposed region 17. With this, the second coated region 16 having a color lighter than the first coated region 15 and the exposed region 17 from which the material color of the metal member 13 is exposed can be formed.

The heavy weight 12 manufactured by the steps described above is fixed to the weight body 11 with the fastening member 110, and is incorporated in the movement. The movement is incorporated in the outer case 2, and thus the watch 1 can be manufactured.

Effects of First Exemplary Embodiment

According to the present exemplary embodiment, the blade-pattern-like design 18 can be formed on the heavy weight 12 of the oscillating weight 10 that is visually recognizable from the case back 9 side of the watch 1. Thus, the watch 1 including the oscillating weight 10 can be provided as a watch using a Japanese sword as its motif. With the Japanese-sword motif, a watch having a high additional value as well as practicality as a watch can be provided.

The material of the metal member 13 is any one of stainless steel, titanium, and silver, and hence is more available than Tamahagane steel being a material of a Japanese sword. Thus, a production cost can be reduced. Further, the metal member 13 is formed through use of any one of stainless steel, titanium, and silver, the coated region 14 is formed by coating a part of the surface of the metal member 13 with the coating material 141 having a black color or the like, and the exposed region 17 from which the material color of the metal member 13 is exposed is formed. With this, a silver-black color tone similar to that obtained by using Tamahagane steel can be reproduced.

With regard to the blade-pattern-like design 18, the surface of the metal member 13 is shaped into the shape of the watch component, specifically, the shape of the heavy weight 12 in the shaping step S1, the coating material 141 adheres thereto in the coating step S2, and a part of the coating material 141 is peeled and removed in the design forming step S3. With this, the regions having different color tones, specifically, the coated region 14 and the exposed region 17 are formed, and the boundary part between the respective regions 14 and 17 forms the design 18. Thus, the watch component on which the blade-pattern-like design 18 is formed can be mass-produced. In other words, a blade pattern of a Japanese sword is formed while changing components of steel through tempering or the like. Further, the oscillating weight 10 being a watch component for a wrist watch is much smaller than a Japanese sword. Therefore, it is difficult to adopt steps for manufacturing a Japanese sword to formation of a blade pattern on a watch component, and it is difficult to mass-produce a watch component on which a blade pattern is formed by executing such manufacturing steps.

In contrast, in the present exemplary embodiment, the coated region 14 covered with the coating material 141 and the exposed region 17 from which the material color of the metal member 13 is exposed are formed, and hence the blade-pattern-like design 18, that is, the design 18 that reminds a user of a blade pattern at the time of visually recognizing the design is formed. With this, a step such as tempering is not required, and the watch component can be mass-produced. In particular, in the design forming step S3, treatment for peeling the coating material 141 can be implemented through machine treatment such as laser treatment. Thus, even a minute component like the heavy weight 12 of the oscillating weight 10 can be subjected to treatment at high accuracy, and the watch component can be mass-produced.

In the design forming step S3, when the coating material 141 is peeled through machine treatment such as laser treatment, blasting, and polishing treatment, only a desired part of the coating material 141 can be peeled. Thus, various types of the blade-pattern-like design 18 can be formed. Thus, a blade pattern of an existing Japanese sword being a model can be reproduced, and a higher additional value can be provided.

Meanwhile, when the coating material 141 is peeled by an operator using a grindstone or the like, the blade-pattern-like design 18 that differs for each product can be formed. Since the design 18 differs for each product, a higher rarity value can be provided.

The coated region 14 includes the two regions including the first coated region 15 and the second coated region 16, and color density is changed between the first coated region 15 and the second coated region 16. Thus, a design modeled after a ridge line, a blade, or the like can be formed, in addition to the blade-pattern-like design 18, and a motif as a Japanese sword can be expressed more explicitly.

The oscillating weight 10 is a movable component that is rotated by swinging the watch 1, and hence movement of the movable component can be emphasized more by forming the blade-pattern-like design 18. In particular, the blade-pattern-like design 18 is formed along the outer circumference of the heavy weight 12 of the oscillating weight 10. Thus, when the oscillating weight 10 is rotated, an expression of brandishing a Japanese sword can be given, which can remind a user of a real Japanese sword.

The oscillating weight 10 is arranged in a space sealed in the outer member such as the outer case 2 and the case back 9. Thus, contact with water or oxygen can be avoided. Thus, formation of rust on the exposed region 17 from which the material color of the metal member 13 is exposed can be prevented, and a design that takes advantage of a pure surface of the material of the metal member 13 can be formed.

Note that the oscillating weight 10 used in the watch is not limited to a weight for winding up a mainspring, and may be used for rotation of a rotor for power generation. In other words, when, in a quartz watch that drives a train wheel with a stepping motor, a power generator including a stator around which a coil is wound and a rotor is incorporated for charging a secondary battery, the oscillating weight 10 may be used for rotating the rotor and generating power.

Second Exemplary Embodiment

Figure 5:
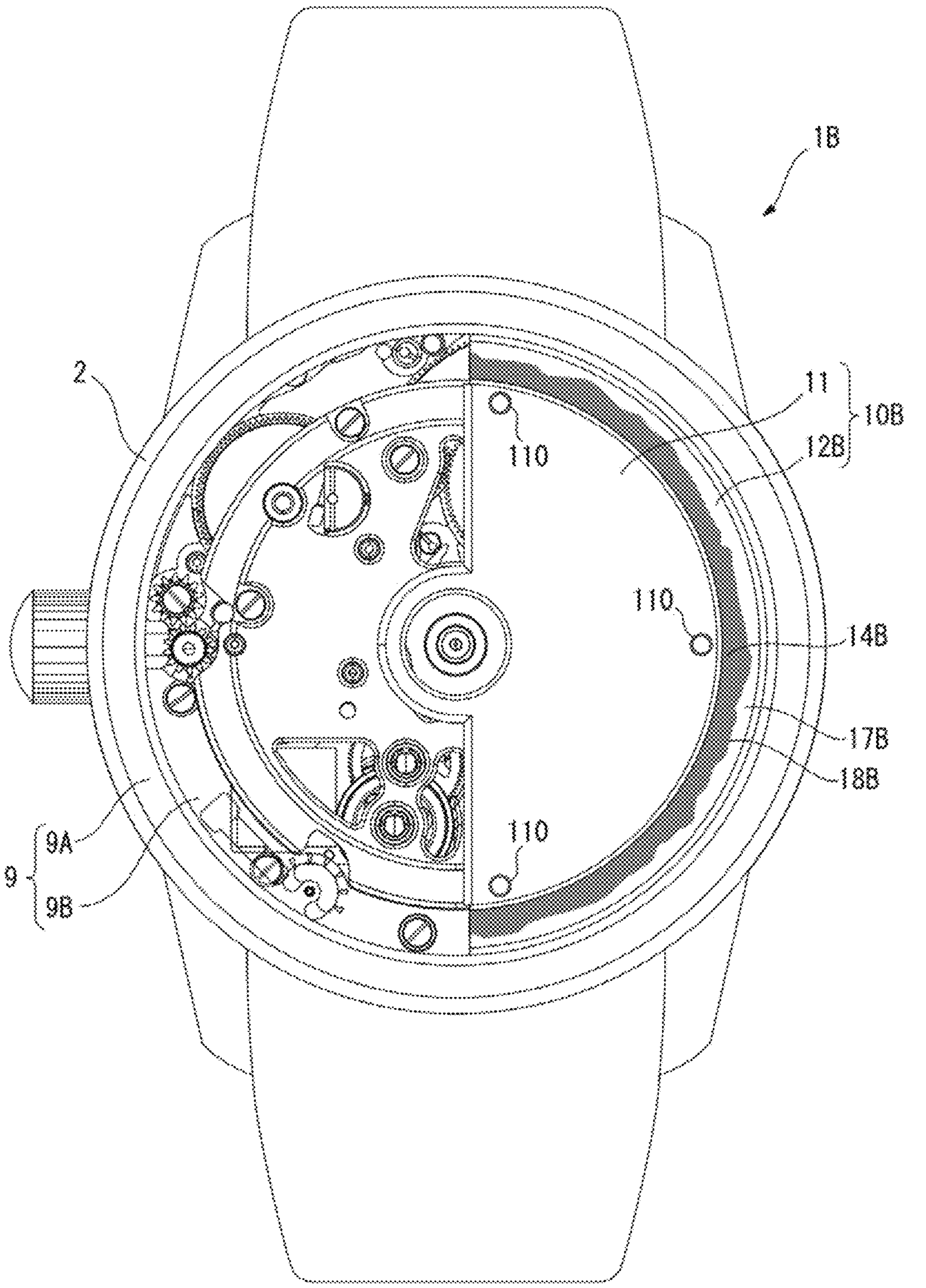
FIG. 5 is a back view illustrating a watch that uses a heavy weight being a watch component of a second exemplary embodiment.

Next, a watch 1B according to a second exemplary embodiment is described with reference to FIG. 5.

The watch 1B is similar to the watch 1 of the first exemplary embodiment, except for a heavy weight 12B of an oscillating weight 10B being a watch component, and hence description therefor is omitted while using the same reference symbols.

The heavy weight 12B is formed of Tamahagane steel. Tamahagane steel is steel that is smelted through the Tatara iron-making process being a traditional iron-making process to be used as a material of a Japanese sword. 90% of its main components is iron, and the remaining part is carbon and the like.

Two regions including the coated region 14B and the exposed region 17B are formed on the surface of the heavy weight 12B, and a boundary line between the respective regions 14B and 17B forms a blade-pattern-like design 18B.

Figure 6:
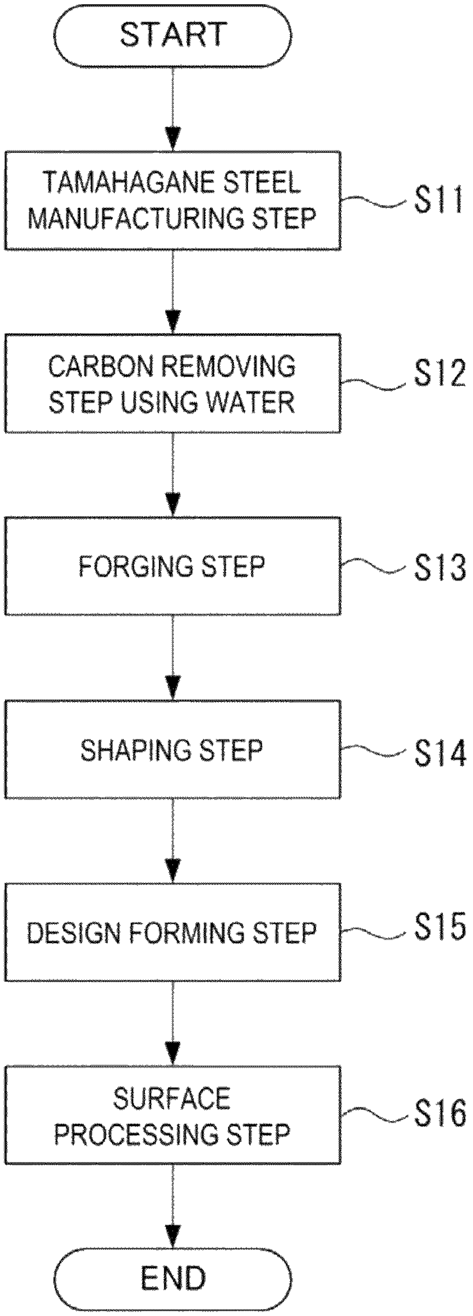
FIG. 6 is a flowchart illustrating manufacturing steps of the heavy weight of the second exemplary embodiment.

Next, a method for manufacturing the heavy weight 12B being a watch component is described with reference to the flowchart of FIG. 6. Note that FIG. 6 is a flowchart including a step for manufacturing Tamahagane steel and a step for processing Tamahagane steel thus manufactured into the heavy weight 12B.

In other words, first, a Tamahagane steel manufacturing step S11 is executed. In Tamahagane steel manufacturing step S11, Tamahagane steel being a material is manufactured through a traditional iron-making process called the Tatara iron-making process.

Subsequently, a carbon removing step S12 using water is executed. In the carbon removing step S12 using water, Tamahagane steel is beaten into a thin layer while being heated, is subjected to tempering, and is divided into small pieces.

Subsequently, a forging step S13 is executed. The material obtained after division into small pieces in the carbon removing step S12 using water is covered with mud and straw ashes, is heated just before melting, and is beaten. This cycle is repeated for a several times, and thus adjustment of a carbon content amount, removal of slag, and adjustment of compositions are performed.

Subsequently, a shaping step S14 is executed. In the shaping step S14, Tamahagane steel thus forged is melted, and is poured into a mold for the heavy weight 12B. Thus, the heavy weight 12B is shaped. After the shaping step S14, the surface of the heavy weight 12B formed of Tamahagane steel reacts with oxygen, and an oxide film is formed. Note that an oxide film may be formed by thermal oxidation through heating at a temperature at which Tamahagane steel is not melted, for example, a temperature of 1,300 degrees or lower under a normal atmosphere in which air is present.

Subsequently, a design forming step S15 for forming the blade-pattern-like design 18B is executed. In the design forming step S15 of the present exemplary embodiment, the design 18B is formed by scratching and peeling an oxide film of the exposed region 17. As a treatment method for peeling the oxide film and forming the design 18B, the method of the first exemplary embodiment, that is, laser treatment, blasting, polishing treatment, or the like may similarly be used.

Subsequently, a surface processing step S16 for preventing rust on the heavy weight 12 is executed. The surface processing step S16 is only required to be processing for exerting a rust-prevention effect without affecting appearance of the heavy weight 12B. Examples of such processing include processing for coupling nitrogen to the surface of Tamahagane steel by heating the heavy weight 12 formed of Tamahagane steel at a high temperature under a nitrogen atmosphere, and processing for covering the surface with polysilazane.

The heavy weight 12B manufactured by the steps described above is fixed to the weight body 11 with the fastening member 110, and is incorporated in the movement. The movement is incorporated in the outer case 2, and thus the watch 1B can be manufactured.

Effects of Second Exemplary Embodiment

In the watch 1B of the second exemplary embodiment, the blade-pattern-like design 18B can also be formed on the oscillating weight 10B. Thus, effects similar to those of the first exemplary embodiment can be exerted. In other words, the watch 1B including the oscillating weight 10B can be provided as a watch using a Japanese sword as its motif. With the Japanese-sword motif, a watch having a high additional value as well as practicality as a watch can be provided. Moreover, the heavy weight 12B is manufactured from Tamahagane steel being a material of a Japanese sword, Thus, a silver-black color tone suitable for a Katana can be obtained due to the coated region 14B being an oxide film and the exposed region 17B from which the material color of Tamahagane steel is exposed, and the watch 1B can be provided with a high additional value. Further, the blade-pattern-like design 18B is formed with the boundary line between the coated region 14B being an oxide film obtained by oxidizing the surface of Tamahagane steel and the exposed region 17B from which Tamahagane steel is exposed by removing the oxide film. Thus, the watch component having the blade-pattern-like design 18B formed from Tamahagane steel being a material of a Japanese sword can be mass-produced.

The blade-pattern-like design 18B is formed on the oscillating weight 10B being a movable component. Thus, due to movement of the movable component, an expression of brandishing a Japanese sword can be given. Due to a synergistic effect exerted by using Tamahagane steel being a material of a Japanese sword, a user can also strongly be reminded of a real Japanese sword.

Due to the surface processing step S16, the surface of the exposed region 17B from which Tamahagane steel is exposed is subjected to the processing. Thus, a rust prevention effect can also be exerted. Thus, the oscillating weight 10B is arranged in the space sealed in the outer case 2, and the surface of the heavy weight 12B is subjected to the rust-prevention processing. With this, formation of rust on the exposed region 17 from which Tamahagane steel is exposed can be prevented, and a design that takes advantage of a pure surface of the material of Tamahagane steel can be formed.

Third Exemplary Embodiment

Figure 7:
FIG. 7 is a front view illustrating a watch that uses a dial being a watch component of a third exemplary embodiment.

Next, a watch 1C according to a third exemplary embodiment is described with reference to FIG. 7. In the watch 1C, a blade-pattern-like design 38 is formed on an outer circumference of a dial 30 being a watch component.

The watch 1C includes an outer case 2C, the dial 30, the hour hand 4, the minute hand 5, and the seconds hand 6. The watch 1C has configurations similar to those of a usual wrist watch, except for the dial 30. Thus, description therefor is omitted.

The dial 30 is a disk-like metal component, and a coated region 34 and an exposed region 37 are formed on an outer circumference side of an indicator 31. As the material of the dial 30, stainless steel, titanium, silver, and the like may be used similarly to the first exemplary embodiment.

The coated region 34 includes a first coated region 35 formed on the indicator 31 side, that is, an inner circumferential side, and a second coated region 36 formed on an outer circumferential side of the first coated region 35. The exposed region 37 is formed on an outer circumferential side of the second coated region 36, and the boundary line between the second coated region 36 and the exposed region 37 forms the blade-pattern-like design 38.

Similarly to the first coated region 15, the first coated region 35 is a region coated with a coating material having a color different from a material color of the dial 30.

Similarly to the second coated region 16, the second coated region 36 is assumed to have a color lighter than the first coated region 35 and darker than the exposed region 37.

The exposed region 37 is assumed to be a region from which the material color of the metal dial 30, for example, a silver color is exposed.

Figure 8:
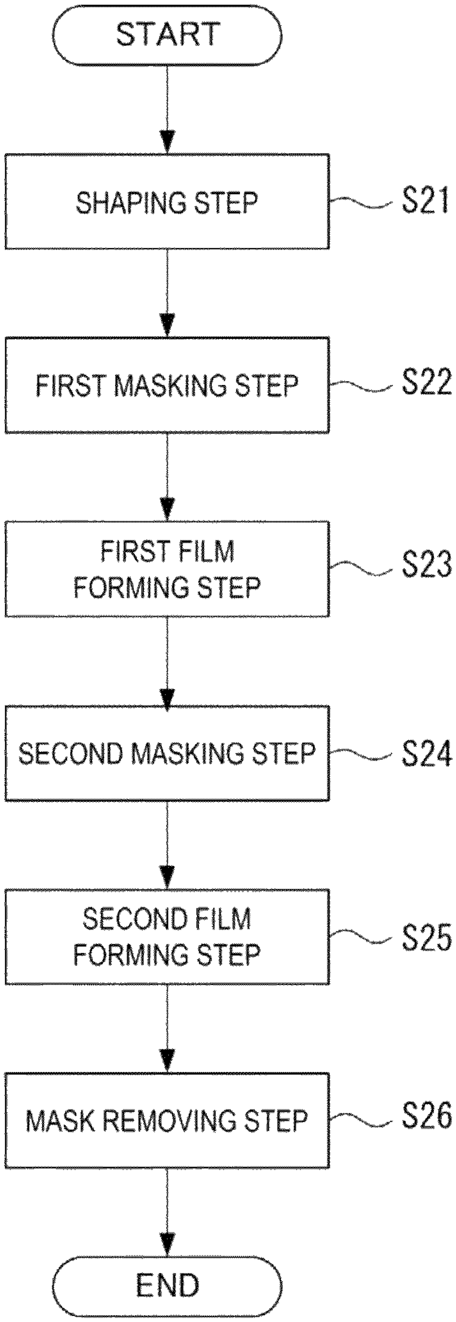
FIG. 8 is a flowchart illustrating manufacturing steps of the dial of the third exemplary embodiment.

Next, a method for manufacturing the dial 30 being a watch component on which the blade-pattern-like design 38 is formed is described with reference to the flowchart of FIG. 8. In the present exemplary embodiment, manufacturing is performed by forming films on the two regions including the first coated region 35 and the second coated region 36 with coating materials having different color tones.

First, a shaping step S21 for shaping the dial 30 by shaping a metal material into a watch component shape is executed. In the present exemplary embodiment, the watch component is the dial 30. Thus, in the shaping step S21, the watch component is shaped by punching a metal plate such as stainless steel plate into a disk-like shape with a pressing machine or the like.

Subsequently, a first masking step S22 for covering the surface of the dial 30 with the masking material except for the coated region 34 is executed.

Subsequently, a first film forming step S23 for forming a film with the coating material on the part that is not covered with the masking material, in other words, the coated region 34 is executed. In the first film forming step S23, a general film forming method such as vapor deposition, sputtering, and CVD may be used. In the first film forming step S23, the coating material having a light color such as gray is used for film formation.

Subsequently, a second masking step S24 for covering the first coated region 35 with the masking material and exposing only the second coated region 36 is executed.

Subsequently, a second film forming step S25 for forming a film on the second coated region 36 with the coating material is executed. The film formation method in the second film forming step S25 is similar to that in the first film forming step S23. In the second film forming step S25, for example, the coating material having a color, for example, black, that is darker than the coating material used for film formation in the first film forming step S23 is used to film formation.

When the film is formed with the coating material on the second coated region 36, the boundary line between the second coated region 36 and the exposed region 37 covered with the masking material forms the blade-pattern-like design 38. Thus, the second film forming step S25 corresponds to the design forming step of the present exemplary embodiment.

Subsequently, a mask removing step S26 for removing the masking material is executed. With this, the boundary line between the exposed region 37 from which the material color of the metal member and the second coated region 36 on which the film is formed with the coating material forms the blade-pattern-like design 38, and the blade-pattern-like design 38 can visually be recognized.

Note that masking may be performed except for the first coated region 35 in the first masking step S22, the film may be formed with the coating material on the first coated region 35 in the first film forming step S23, masking may be performed except for the second coated region 36 in the second masking step S24, and the film may be formed with the coating material on the second coated region 36 in the second film forming step S25.

Effects of Third Exemplary Embodiment

In the watch 1C of the third exemplary embodiment, the blade-pattern-like design 38 can be formed on the dial 30. Thus, similarly to each of the exemplary embodiments, the watch 1C using a Japanese sword as its motif can be provided. With the Japanese-sword motif, a watch having a high additional value as well as practicality as a watch can be provided.

Further, the dial 30 can always be recognized with eyes under a state in which the watch 1C is worn on a wrist. Thus, a user can always be reminded of a motif as a Japanese sword, and a sense of satisfaction can be enhanced.

The dial 30 is a component having a larger area than the other watch components, and hence the blade-pattern-like design 38 can easily be formed. Further, the design 38 is formed on the outer circumferential side of the indicator 31, and hence both practicality and design can be achieved in a balanced manner without impairing visual recognition of the indicator 31 indicated with the hour hand 4, the minute hand 5, and the seconds hand 6.

The coated region 34 includes the two regions including the first coated region 35 and the second coated region 36, and color density is changed between the first coated region 35 and the second coated region 36. Thus, a design modeled after a ridge line, a blade, or the like can be formed, in addition to the blade-pattern-like design 38, and a motif as a Japanese sword can be expressed more explicitly.

The first coated region 35 and the second coated region 36 are formed by executing the first masking step S22, the first film forming step S23, the second masking step S24, the second film forming step S25, and the mask removing step S26. Thus, it is not required to peel the coating material after film formation and form the exposed region 37, and a use amount of the coating material can be suppressed, which advantageously leads to cost reduction.

Further, the blade-pattern-like design 18 is formed through film formation, and hence the dial 30 can be mass-produced.

Moreover, the material of the dial 30 is any one of stainless steel, titanium, and silver, and hence is more available than Tamahagane steel. Thus, a production cost can be reduced. Further, any one of stainless steel, titanium, and silver is used to form the dial 30, and the film is formed on the surface of the outer circumferential portion thereof. With this, the coated region 34 is formed. Thus, a silver-black color tone similar to that obtained by using Tamahagane steel can be reproduced.

The dial 30 is arranged in a space sealed in the outer case 2, and hence contact with water or oxygen can be avoided. Thus, formation of rust on the exposed region 37 from which the dial 30 is exposed can be prevented, and a design that takes advantage of a pure surface of the material of the dial 30 can be formed.

Figure 9:
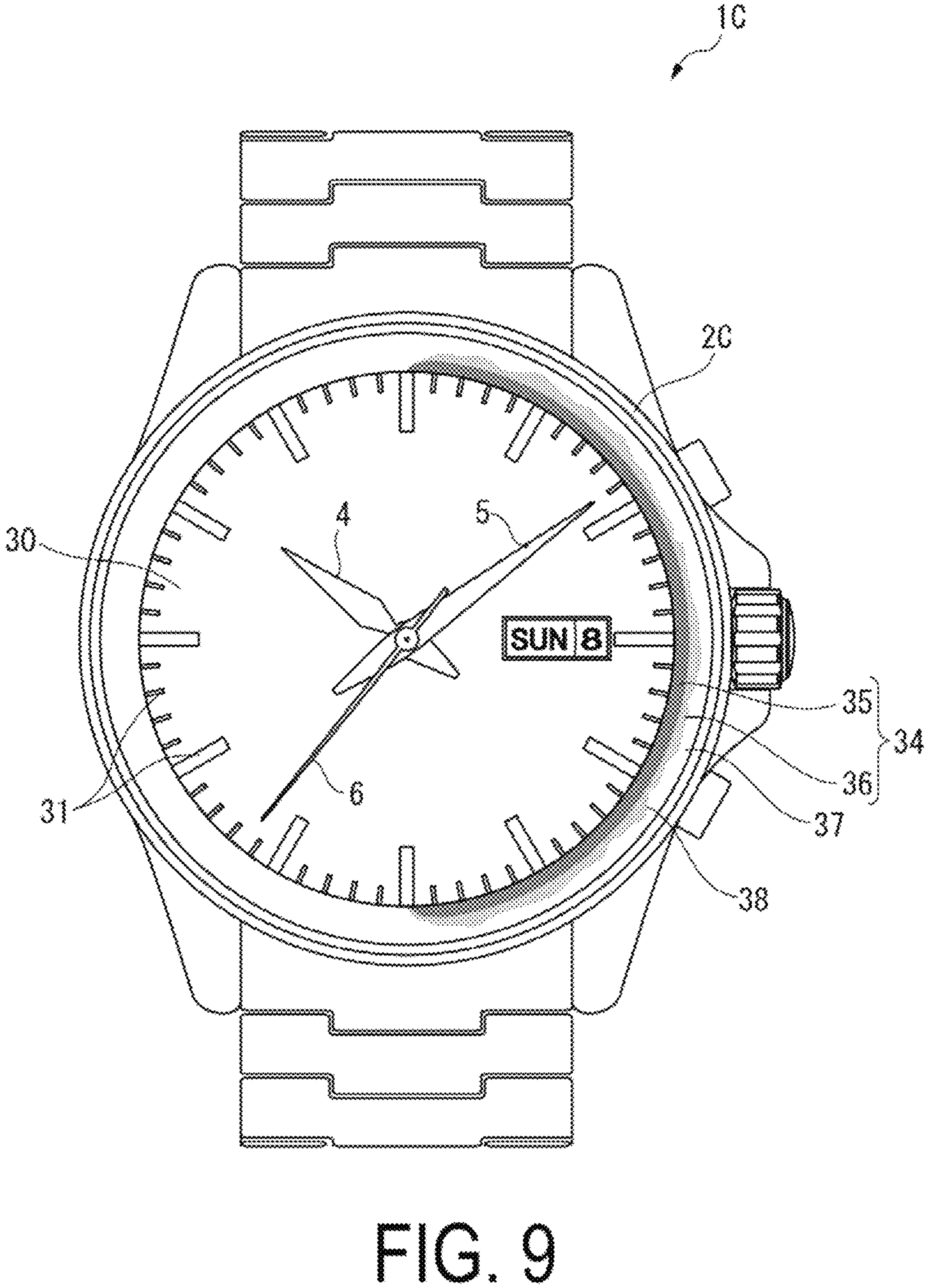
FIG. 9 is a front view illustrating a modification example of the dial of the third exemplary embodiment.

Note that the blade-pattern-like design 38 formed on the dial 30 is not limited to the design formed on the entire outer circumference of the dial 30. Similarly to the watch 1C illustrated in FIG. 9, the design may be formed on a part of the outer circumference of the dial 30. Further, in FIG. 9, the first coated region 35 and the second coated region 36 of the coated region 34 and the exposed region 37 are formed from the position corresponding to twelve o'clock to the position corresponding to six o'clock in the clockwise direction on the dial 30, and thus the blade-pattern-like design 38 is provided. However, the formation position of the design 38 or its number may be set as appropriate. The design 38 may be formed on a plurality of parts on the outer circumference of the dial 30, for example, on two parts including a part from the position corresponding to one o'clock to the position corresponding to five o'clock and a part from the position corresponding to seven o'clock to the position corresponding to eleven o'clock on the dial 30.

Fourth Exemplary Embodiment

Next, a watch 1D according to a fourth exemplary embodiment is described with reference to FIG. 10. In the watch 1D is a watch including a band 40 as a watch component. The band 40 has a surface having a blade-pattern-like design formed thereon.

The watch 1D includes an outer case 2D, the dial 3, the hour hand 4, the minute hand 5, and the seconds hand 6, and has configurations similar to those of a usual wrist watch, except for the band 40. Thus, description therefor is omitted.

The band 40 is obtained by coupling a plurality of metal blocks 41 to each other with pins or the like. A structure of the band 40 including the metal blocks 41 is similar to a general metal band, and hence description therefor is omitted.

A coated region 44 and an exposed region 47 are formed on a surface of the block 41. Similarly to the first exemplary embodiment, stainless steel, titanium, silver, and the like may be used as the material of the block 41.

The coated region 44 includes a first coated region 45 formed to have a substantially circular shape with the surface of the block 41 as a center and a second coated region 46 formed to have a substantially ring shape on an outer circumferential side of the first coated region 45. The exposed region 47 is formed on an outer circumferential side of the second coated region 46, and the boundary line between the second coated region 46 and the exposed region 47 forms a blade-pattern-like design 48.

Similarly to the first exemplary embodiment and the third exemplary embodiment, the first coated region 45 is assumed to have a color darker than the second coated region 46 and the exposed region 47. The second coated region 46 is assumed to have a color that is lighter than the first coated region 45 and darker than the exposed region 47.

The exposed region 47 is assumed to be a region from which the material color of the metal block 41, for example, a silver color is exposed.

A method for manufacturing the band 40 being a watch component on which the above-mentioned blade-pattern-like design 48 is formed is similar to the first exemplary embodiment, and hence description therefor is simplified.

First, the metal material is shaped into a shape of the block 41 being a watch component. In the present exemplary embodiment, the watch component is the block 41. Thus, the metal material such as stainless steel is melted, and is poured into a mold for the block 41. With this, the block 41 is shaped.

Subsequently, the coating material 141 is applied to the surface of the block 41. After that, similarly to the design forming step S3, the second coated region 46 and the exposed region 47 are formed by peeling a part of the coating material 141.

Then, the respective blocks 41 are coupled to each other with pins or the like, and thus the band 40 is manufactured.

Effects of Fourth Exemplary Embodiment

The watch 1D of the fourth exemplary embodiment can exert actions and effects that are similar to those in each of the exemplary embodiments. In other words, the blade-pattern-like design 48 can be formed on the block 41 of the band 40. Thus, similarly to each of the exemplary embodiments, the watch 1D using a Japanese sword as its motif can be provided. With the Japanese-sword motif, a watch having a high additional value as well as practicality as a watch can be provided.

Further, the block 41 of the band 40 can always be recognized with eyes under a state in which the watch 1D is worn on a wrist. Thus, a user can always be reminded of a motif as a Japanese sword, and a sense of satisfaction can be enhanced. Moreover, the block 41 of the band 40 is a component having a relatively larger area than the other watch components, and hence the blade-pattern-like design 48 can easily be formed.

Figure 10:
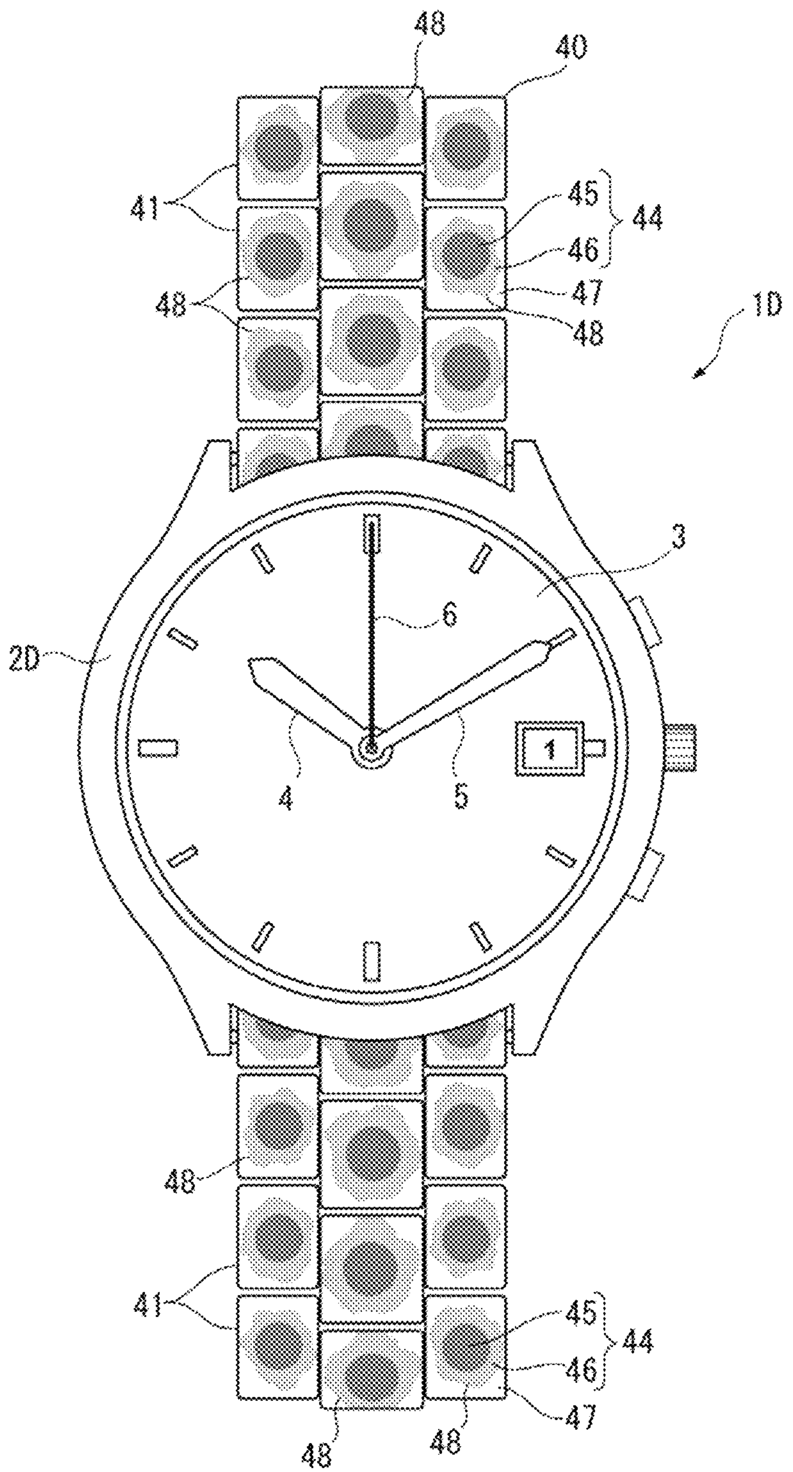
FIG. 10 is a front view illustrating a watch that uses a band being a watch component of a fourth exemplary embodiment.
Figure 11:
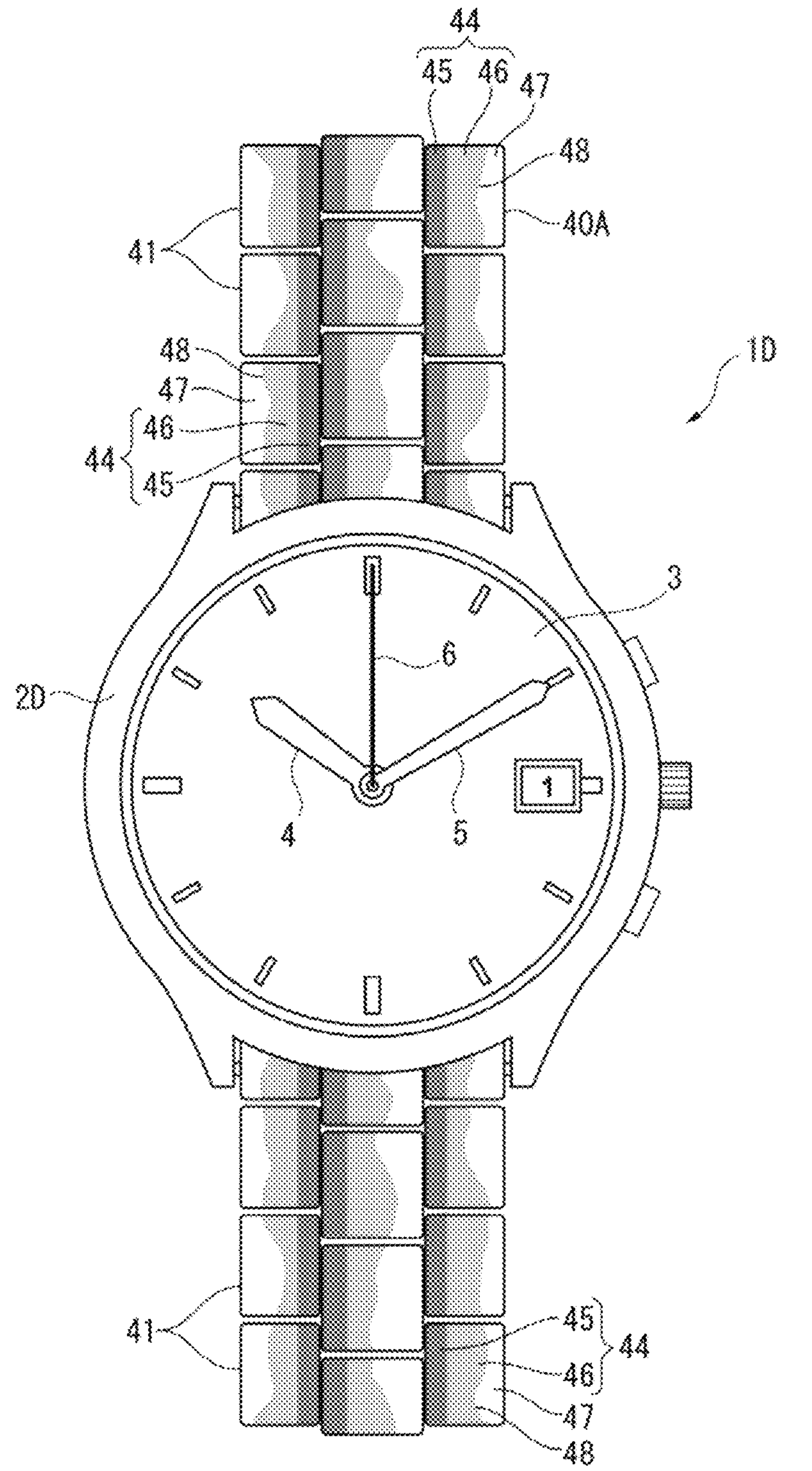
FIG. 11 is a front view illustrating a modification example of the band of the fourth exemplary embodiment.

Note that the design on the block 41 of the band 40 is not limited to the design illustrated in FIG. 10. As in a case of a band 40A of the watch 1D illustrated in FIG. 11, the first coated region 45, the second coated region 46, and the exposed region 47 are provided on the surface of each of the blocks 41 so that the regions are continuous over the plurality of blocks 41 along the longitudinal direction of the band 40A, and thus the blade-pattern-like design 48 may be formed.

Figure 12:
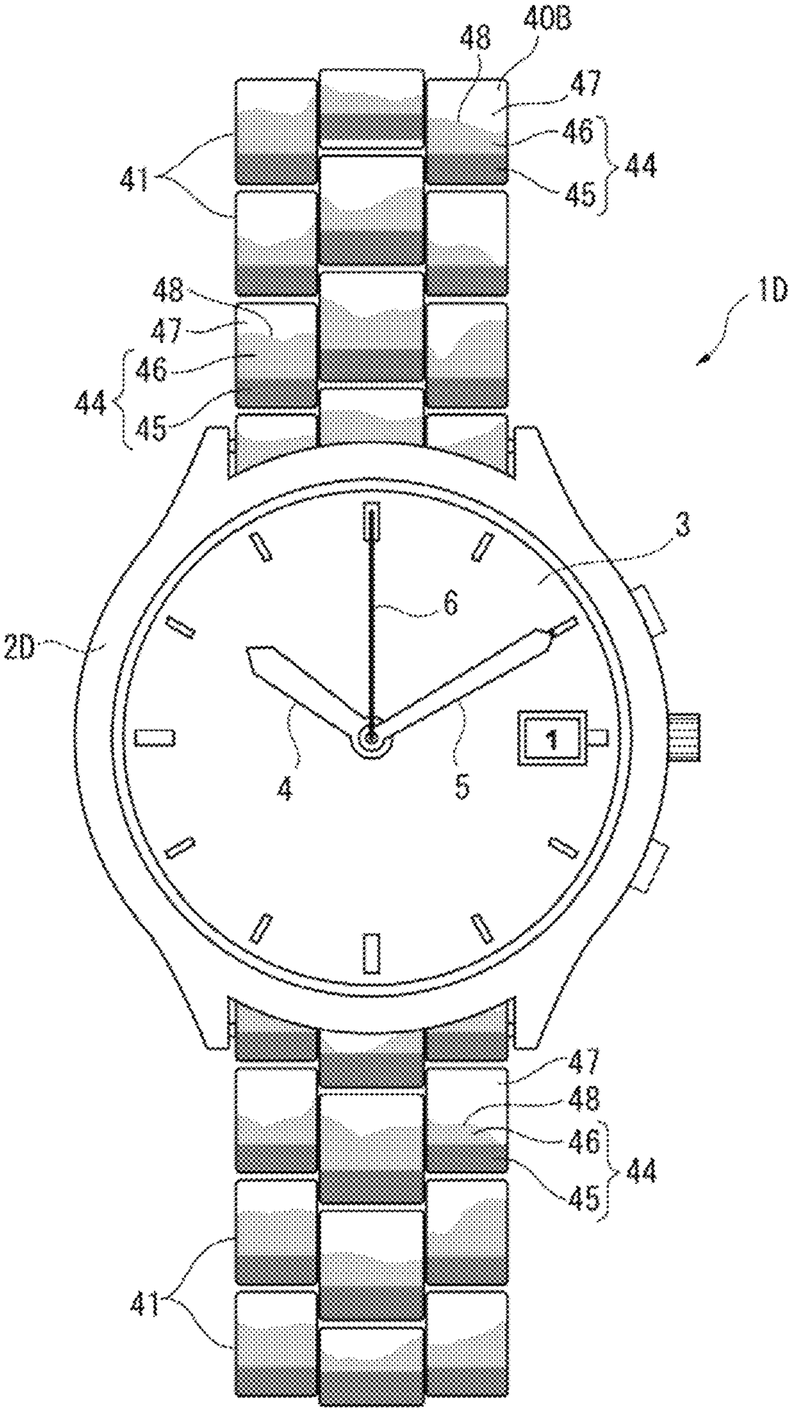
FIG. 12 is a front view illustrating another modification example of the band of the fourth exemplary embodiment.

Further, as in a case of a band 40B of the watch 1D illustrated in FIG. 12, the first coated region 45, the second coated region 46, and the exposed region 47 are provided along the short-side direction of the band 40B on the surface of each of the blocks 41, and thus the blade-pattern-like design 48 may be formed.

Figure 13:
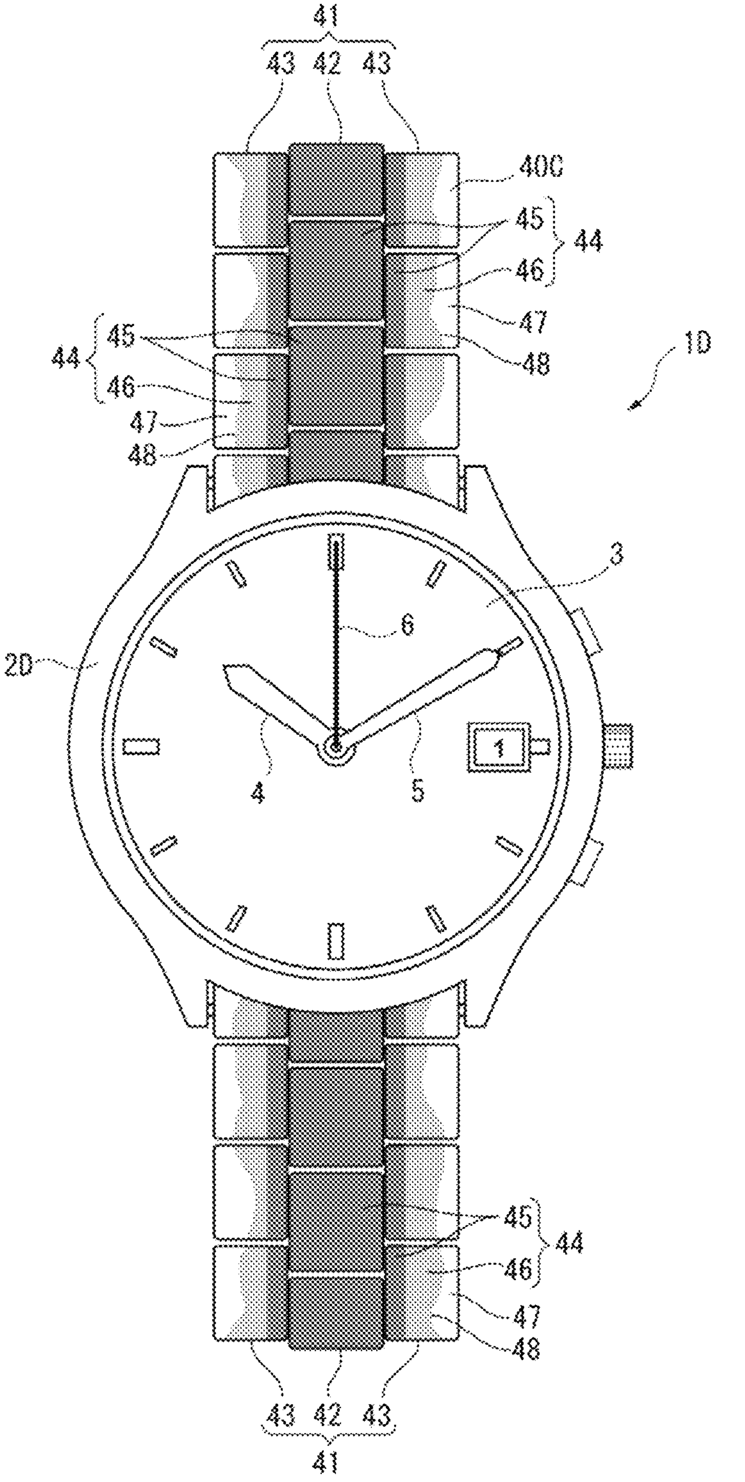
FIG. 13 is a front view illustrating another modification example of the band of the fourth exemplary embodiment.

Moreover, the design is not limited to the design 48 formed by providing the coated region 44 and the exposed region 47 on each of the blocks 41. For example, as in a case of a band 40C of the watch 1D illustrated in FIG. 13, regions that are different for an inner block 42 and an outer block 43 being the blocks 41 may be provided, and thus the blade-pattern-like design 48 may be formed with the entire band 40C. In other words, the first coated region 45 is formed on the inner blocks 42 that are arranged at the center of the band 40C in the width direction. Further, on the surface of the outer blocks 43 that are arranged on both the sides of the inner blocks 42, the first coated region 45, the second coated region 46, and the exposed region 47 are sequentially formed from the inner block 42 side, that is, the center of the band 40C to the outer edges of the band 40C. With the band 40C thus configured, the blade-pattern-like design 48 that is continuous along the longitudinal direction of the band 40C on both the sides of the band 40C can be formed.

Fifth Exemplary Embodiment

Figure 14:
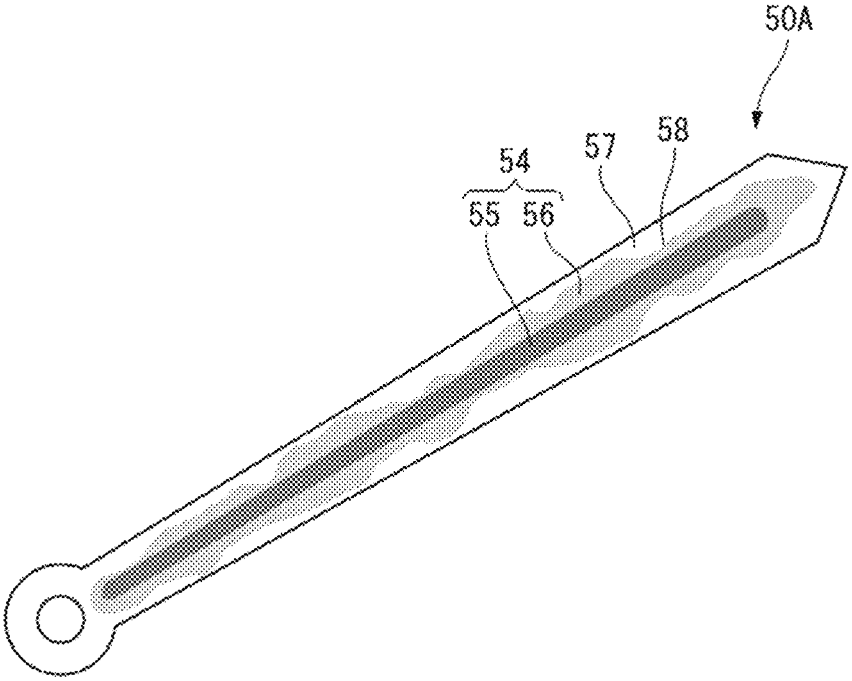
FIG. 14 is a front view illustrating a hand being a watch component of a fifth exemplary embodiment.

Next, a hand 50A being a watch component according to a fifth exemplary embodiment is described with reference to FIG. 14. The hand 50A is an hour hand, a minute hand, a seconds hand, a counting hand, a power reserve hand, or the like that indicates various information such as a time, a measured time period, and a lasting time period on a watch.

Similarly to each of the exemplary embodiments, the hand 50A is obtained by shaping the metal material such as stainless steel, titanium, silver, and Tamahagane steel.

A coated region 54 and a exposed region 57 are formed on a surface of the hand 50A. The coated region 54 includes a first coated region 55 formed into a substantially linear shape extending from a base end fixed to a rotary shaft to a distal end on the hand 50A and a second coated region 56 formed in the periphery of the first coated region 55. The exposed region 57 is formed on an outer side of the second coated region 56, and the boundary line between the second coated region 56 and the exposed region 57 forms a blade-pattern-like design 58 on the entire outer circumference of the hand 50A.

The first coated region 55 is assumed to have a color darker than the second coated region 56 and the exposed region 57. The second coated region 56 is assumed to have a color that is lighter than the first coated region 55 and is darker than the exposed region 57. The exposed region 57 is assumed to be a region from which the material color of the metal the hand 50A, for example, a silver color is exposed.

Figure 15:
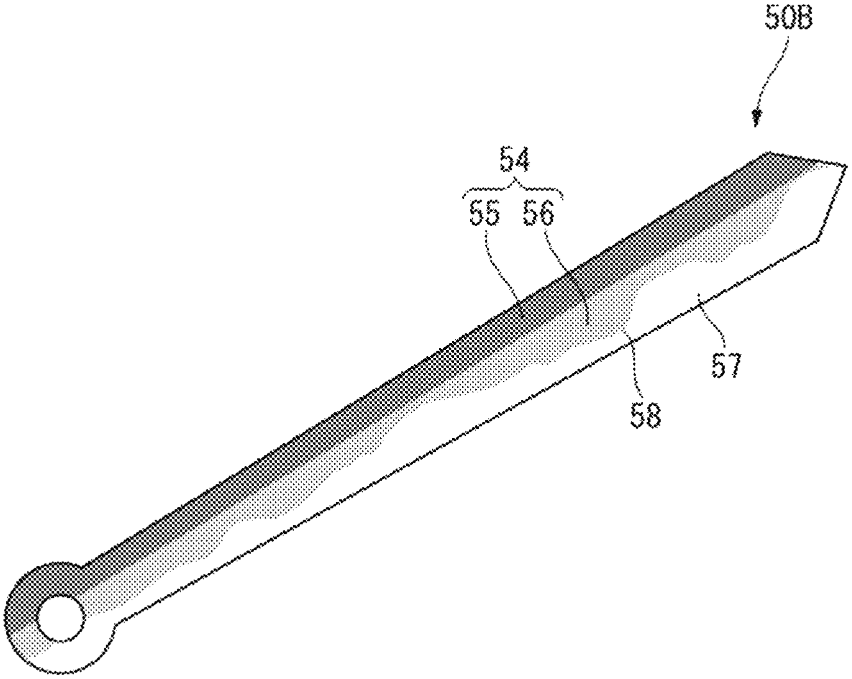
FIG. 15 is a front view illustrating a modification example of the hand of the fifth exemplary embodiment.

Note that, with regard to the hand, as in a case of a hand 50B illustrated in FIG. 15, the blade-pattern-like design 58 may be formed on one side of the hand 50B. In other words, the first coated region 55 and the second coated region 56 of the coated region 54 and the exposed region 57 are sequentially formed from one side edge to the other side edge of the hand With this, the boundary line between the second coated region 56 and the exposed region 57 forms the blade-pattern-like design 58 along one side of the hand 50B.

A method for forming the blade-pattern-like design 58 on each of the hands 50A and 50B is similar to that in each of the exemplary embodiments. In other words, the metal material is shaped into a shape of the hand 50A, 50B being a watch component. For example, the hand 50A, 50B is shaped by subjecting a metal plate material to pressing.

Subsequently, the surface of the hand 50A, 50B is covered with the coating material, and then the coating material is peeled through laser treatment or the like. Thus, the second coated region 56 and the exposed region 57 are formed. Alternatively, under a state in which the exposed region 57 or the like is covered with the masking material, a film may be formed on the first coated region 55 and the second coated region 56 by a film forming method such as vapor deposition. Moreover, surface processing for rust prevention may be executed. The hand 50A, 50B can be manufactured with the above-mentioned steps.

Effects of Fifth Exemplary Embodiment

The blade-pattern-like design 58 is formed on the hand 50B, and thus effects similar to those of each of the exemplary embodiments can be exerted. Moreover, the hand 50A, is a movable component, and hence an expression of brandishing a Japanese sword can be given similarly to the oscillating weight 10, 10B. In particular, the hand 50A, 50B has an elongated shape, which is closest to a Katana shape among the watch components. Thus, a motif as a Japanese sword can be emphasized more.

Other Exemplary Embodiments

Note that the present disclosure is not limited to each of the exemplary embodiments, and various modifications may be made within the scope of the present disclosure.

Figure 16:
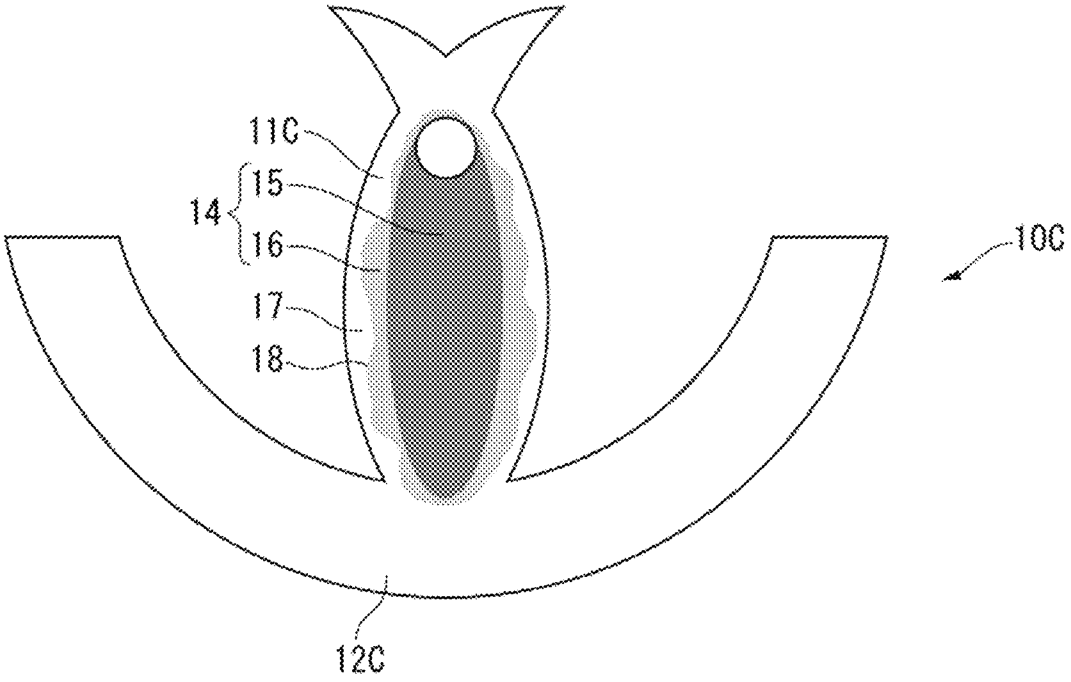
FIG. 16 is a front view illustrating a modification example of an oscillating weight being a watch component.

For example, the design 18 formed on the oscillating weight is not limited to the design formed along the outer circumference of the oscillating weight. For example, as in a case of an oscillating weight 10C illustrated in FIG. 16, the design may be formed other than the outer circumference of the oscillating weight. The oscillating weight 10C includes a weight body 11C and a heavy weight 12C. The weight body 11C is a portion that couples a rotary shaft used for winding up a mainspring or the like and the heavy weight 12C to each other, and is formed so that both side surfaces are curved outward. Further, an end of the weight body 11C, which is an end opposite to the heavy weight 12C, is assumed to have a sharp distal shape. The heavy weight 12C is formed in a planar and substantially arc shape.

The first coated region 15 is formed at the center of the surface of the weight body 11C, and the second coated region 16 is formed on both the sides thereof. On the outer side of the second coated region 16, the exposed region 17 is formed. The boundary line between the second coated region 16 and the exposed region 17 forms the blade-pattern-like design 18.

Even when the blade-pattern-like design 18 is formed on the weight body 11C of the oscillating weight 10C, an expression of brandishing a Katana can be provided because the weight body 11C is also rotated along with rotation of the oscillating weight 10C. Thus, a user can be reminded of a Japanese sword.

The watch component on which the blade-pattern-like design is formed is not limited to an oscillating weight, a dial, a band, and a hand, and may be an outer case, a case back, a bezel, and the like. The watch component is only required to be a watch component that is visually recognizable in a watch. Further, the movable component on which the blade-pattern-like design is formed is not limited to an oscillating weight and a hand. For example, the movable component may be a balance with a hairspring, a pallet fork, and the like, or may be a gear wheel and the like.

Further, the metal material for forming the watch component is not limited to stainless steel, titanium, silver, and Tamahagane steel in the exemplary embodiments, and may be other metal materials. Note that, when a watch component such as an outer case, a case back, and a bezel that is exposed to an outside of a watch is formed of a material such as Tamahagane steel that rusts easily, surface processing such as nitriding and polysilazane coating that can exert a rust prevention effect without impairing purity of the metal material may be executed.

The treatment method for forming the coated region and the exposed region on the watch component may be selected as appropriate in accordance with a shape, a size, a material of the watch component. For example, as in the third exemplary embodiment, a design may be formed on an oscillating weight, a band, or a hand by a method for forming a design by executing a masking step or a film forming step. Similarly, a design may also be formed on a dial by a method for peeling a part of a coating material. Further, the blade-pattern-like design may be expressed by forming irregularities on a part of the surface of the exposed region, or the design may be printed through use of an ink that can be used for printing on a metal surface. In other words, the coating material may be applied to the surface of the metal member or Tamahagane steel, the coating material is peeled off by scratching the surface, the surface is subjected to treatment to have irregularities, or printing is performed with an ink. With those various types of surface processing, the design that looks like a blade pattern may be formed without changing components of the metal member or Tamahagane steel.

When the color of the coated region is set, a color of an existing Japanese sword may be measured with a colorimeter, and the color of the coated region may be set based on data thus obtained.

The coated region is not limited to a region including one region or two regions, and may include three or more regions. Further, when the coated region include one region, gradation may be formed. Alternatively, the first coated region and the second coated region may be formed to have gradation. Moreover, the exposed region may be formed to have gradation.

The blade-pattern-like design is not limited to the design that is formed continuously along an outer circumference of one component or the like, and may be a plurality of designs that are divided in the middle. The design may be terminated in a middle of a component, for example, by being formed only at a distal end portion of a hand.

Summary of Present Disclosure

A watch component according to the present disclosure is formed of a metal member formed into a component shape, wherein a surface of the metal member includes a coated region being coated with a coating material having a color different from a material color of the metal member and an exposed region from which the material color of the metal member is exposed, and a boundary part between the coated region and the exposed region forms a blade-pattern-like design.

According to the present disclosure, the blade-pattern-like design can be formed on the watch component. With the Japanese-sword motif, a watch having a high additional value as well as practicality as a watch can be provided. Further, the exposed region from which the material color of the metal member is exposed and the coated region coated with the coating material having a color different from the material color of the metal member are provided on the watch component, and the blade-pattern-like design is formed with the boundary part between those regions. With this, a step for manufacturing an actual Japanese sword is not required, and thus the watch component can be mass-produced.

A watch component according to the present disclosure is formed of Tamahagane steel formed into a component shape, wherein the Tamahagane steel has a surface having a coated region being coated with an oxide film and an exposed region from which a material color of the Tamahagane steel is exposed, and a boundary part between the coated region and the exposed region forms a blade-pattern-like design.

According to the present disclosure, the blade-pattern-like design can be formed on the watch component. With the Japanese-sword motif, a watch having a high additional value as well as practicality as a watch can be provided. Further, the exposed region from which the material color of Tamahagane steel is exposed and the coated region coated with the oxide film are provided on the watch component, and the blade-pattern-like design is formed with the boundary part between those regions. With this, a step for manufacturing an actual Japanese sword is not required, and thus the watch component can be mass-produced. Moreover, the watch component is manufactured from Tamahagane steel being a material of a Japanese sword. Thus, a silver-black color tone suitable for a Katana can be obtained, and the watch can be provided with a high additional value.

In the watch component according to the present disclosure, the metal member may any one of stainless steel, titanium, and silver.

When any one of stainless steel, titanium, and silver is used as the metal member, the material is more available than Tamahagane steel, and a production cost can be reduced. Further, any one of stainless steel, titanium, and silver is used to form the metal member, and the surface thereof is coated with the coating material having a black color. Thus, a silver-black color tone similar to that obtained by using Tamahagane steel can be reproduced.

In the watch component according to the present disclosure, the watch component may be a component movable in a watch.

The blade-pattern-like design can be formed on a watch component such as an oscillating weight and a hand that is movable in a watch. Thus, movement of the movable component can be emphasized more.

In the watch component according to the present disclosure, the watch component may be an oscillating weight or a hand.

When the watch component is an oscillating weight or a hand, an expression of brandishing a Japanese sword can be given because the blade-pattern-like design is also rotated along with rotation of the oscillating weight or the hand. Thus, a user can be reminded of a real Japanese sword.

In the watch component according to the present disclosure, the watch component may be a dial, and the blade-pattern-like design may be formed along an outer circumference of the dial.

The dial is a component having a larger area than the other watch components, and hence the blade-pattern-like design can easily be formed. Further, the dial can always be recognized with eyes under a state in which the watch is worn on a wrist. Thus, a user can always be reminded of a motif as a Japanese sword, and a sense of satisfaction can be enhanced.

The watch component according to the present disclosure may be a band.

The block of the band is a component having a relatively larger area than the other watch components, and hence the blade-pattern-like design can easily be formed. Further, the band can always be recognized with eyes under a state in which the watch is worn on a wrist. Thus, a user can always be reminded of a motif as a Japanese sword, and a sense of satisfaction can be enhanced.

The watch according to the present disclosure includes the above-described watch component.

According to the present disclosure, the watch component having the blade-pattern-like design formed thereon is included. Thus, a watch with a high additional value that uses a Japanese sword as its motif can be mass-produced.

In the watch according to the present disclosure, the watch component may be arranged in a space sealed in an outer member of a watch.

The watch component is arranged in a space sealed in the outer member, and hence the watch component can be prevented from contacting with water or oxygen. Thus, formation of rust on the exposed region from which the material color of the watch component is exposed can be prevented, and a design that takes advantage of a pure surface of the material of the metal member or Tamahagane steel can be formed.

A method for manufacturing a watch component according to the present disclosure includes a shaping step for shaping a metal member by shaping a metal material into a watch component shape, a coating step for coating a surface of the metal member with a coating material having a color different from a material color of the metal member, and a design forming step for forming, by peeling a part of the coating material, an exposed region from which the material color of the metal member is exposed, and forming, with a coated region being coated with the coating material, a blade-pattern-like design at a boundary part therebetween.

According to the present disclosure, the coated region coated with the coating material and the exposed region from which the material color of the metal member is exposed are formed, and thus the blade-pattern-like design is formed. With this, a step such as tempering is not required, and the watch component can be mass-produced.

A method for manufacturing a watch component according to the present disclosure includes a shaping step for shaping a metal member by shaping a metal material into a watch component shape, a masking step for masking, with a masking material, an exposed region from which a material color of the metal member is exposed, a design forming step for forming a coated region by coating a surface of the metal member with a coating material having a color different from a material color of the metal member, and forming, with the exposed region, a blade-pattern-like design at a boundary part therebetween, and a mask removing step for removing the masking material.

According to the present disclosure, the coated region coated with the coating material and the exposed region from which the material color of the metal member is exposed are formed, and thus the blade-pattern-like design is formed. With this, a step such as tempering is not required, and the watch component can be mass-produced. Further, under a state in which the exposed region is covered with the masking material, the coated region is formed by performing coating with the coating material. Thus, it is not required to peel the coating material and form the exposed region after removing the masking material in the mask removing step, and a use amount of the coating material, which can reduce a cost.

A method for manufacturing a watch component according to the present disclosure includes a shaping step for shaping Tamahagane steel into a watch component shape, and a design forming step for forming, by pealing a part of an oxide film coating a surface of the Tamahagane steel, an exposed region from which a material color of the Tamahagane steel is exposed, and forming, with a coted region being coated with the oxide film, a blade-pattern-like design at a boundary part therebetween.

According to the present disclosure, the coated region coated with the oxide film and the exposed region from which the material color of Tamahagane steel is exposed are formed, and thus the blade-pattern-like design is formed. With this, a step such as tempering is not required, and the watch component can be mass-produced. Moreover, the watch component is manufactured from Tamahagane steel being a material of a Japanese sword. Thus, a silver-black color tone suitable for a Katana can be obtained, and the watch can be provided with a high additional value.

In the method for manufacturing a watch component according to the present disclosure, in the design forming step, the blade-pattern-like design may be formed by peeling a part of the coating material or the oxide film by blasting, laser treatment, or polishing treatment.

According to the present disclosure, the coating material or a part of the oxide film is peeled through blasting, laser treatment, or polishing treatment. Thus, only a desired part can be peeled, and a desired blade-pattern-like design can be formed.

In the method for manufacturing a watch component according to the present disclosure, the coating material may be formed by a treatment method selected from vapor deposition, sputtering, and chemical vapor deposition.

According to the present disclosure, the film is formed with the coating material by vapor deposition, sputtering, or chemical vapor deposition. Thus, the coating material is not required to be peeled, a desired blade-pattern-like design can be formed.

The method for manufacturing a watch component according to the present disclosure may further include a surface processing step for coating the coated region and the exposed region with nitrogen or polysilazane.

According to the present disclosure, the surface processing step can protect the coated region and the exposed region, and formation of rust on the watch component can also be prevented.

What is claimed is:

1. A method for manufacturing a watch component, the method comprising:

shaping Tamahagane steel into a watch component shape;

forming an oxide film on a surface of the Tamahagane steel, the surface being a coated region which is coated with the oxide film;

peeling a part of the oxide film to form an exposed region from which a material color of the Tamahagane steel is exposed; and forming a blade-pattern design at a boundary part between the coated region and the exposed region, wherein the coated region includes a first coated region that is a region modeled after a ridge line of a Japanese sword and has a first color, and a second coated region that is a region modeled after a blade of the Japanese sword and has a second color that is lighter than the first coated region, and wherein a boundary part between the second coated region and the exposed region forms the blade-pattern design that includes the first coated region and the second coated region, and is a design formed by a difference of the colors in each of the first coated region, the second coated region, and the exposed region.

2. The method for manufacturing a watch component according to claim 1, wherein the second coated region is disposed between the first coated region and the exposed region, and is formed by peeling a part of the oxide film of the coated region, and a first removal amount of the oxide film to form the second coated region is smaller than a second removal amount of the oxide film to form the exposed region.

3. The method for manufacturing a watch component according to claim 2, wherein the oxide film is removed by laser treatment, the second coated region is formed by irradiating laser light beam with a first intensity of the laser light beam, and the exposed region is formed by irradiating the laser light beam with a second intensity of the laser light beam greater than the first intensity.

4. The method for manufacturing a watch component according to claim 1, wherein the oxide film is removed by blasting or polishing treatment.

5. The method for manufacturing a watch component according to claim 1, comprising:

coating the coated region and the exposed region with nitrogen or polysilazane.

* * * * *